US 6,760,116 B2
(12) United States Patent
Iwasaki

(10) Patent No.: US 6,760,116 B2
(45) Date of Patent: Jul. 6, 2004

(54) THREE-DIMENSIONAL SHAPE AND COLOR DETECTING APPARATUS

(75) Inventor: Takeo Iwasaki, Aichi-ken (JP)

(73) Assignee: Brother Kogyo Kabushiki Kaisha, Aichi-Ken (JP)

(*) Notice: Subject to any disclaimer, the term of this patent is extended or adjusted under 35 U.S.C. 154(b) by 0 days.

(21) Appl. No.: 10/313,839

(22) Filed: Dec. 6, 2002

(65) Prior Publication Data
US 2003/0107747 A1 Jun. 12, 2003

(30) Foreign Application Priority Data
Dec. 7, 2001 (JP) ........................................ 2001-374382

(51) Int. Cl.[7] .............................................. G01B 11/30
(52) U.S. Cl. ....................................... 356/601; 356/3.01
(58) Field of Search ................................ 356/600–602, 356/606–608, 612, 614–615, 620–625, 629, 640, 2–3.01, 3.09; 250/559.19, 559.22, 559.23, 237 G; 382/286

(56) References Cited

U.S. PATENT DOCUMENTS

| 4,846,577 A | * | 7/1989 | Grindon ..................... 356/610 |
| 4,867,570 A | * | 9/1989 | Sorimachi et al. ........... 356/603 |
| 5,104,227 A | * | 4/1992 | Uesugi et al. ............... 356/607 |
| 5,495,429 A | * | 2/1996 | Craven et al. ............... 702/127 |
| 5,747,822 A | * | 5/1998 | Sinclair et al. ......... 250/559.19 |
| 5,754,680 A | * | 5/1998 | Sato et al. ................... 382/154 |
| 5,847,833 A | * | 12/1998 | Yokoyama et al. ......... 356/613 |
| 6,291,817 B1 | * | 9/2001 | Kobayashi et al. ..... 250/237 G |

FOREIGN PATENT DOCUMENTS

| JP | 61089505 | | 5/1986 |
| JP | 03 029 806 | * | 2/1991 |
| JP | 5280941 | | 10/1993 |
| JP | 09 210 646 | * | 8/1997 |
| JP | 11 326 057 | * | 11/1999 |
| JP | 2001145126 | | 5/2001 |
| JP | 2001156116 | | 6/2001 |

* cited by examiner

Primary Examiner—Frank G. Font
Assistant Examiner—Sang H. Nguyen
(74) Attorney, Agent, or Firm—Pitney Hardin LLP

(57) ABSTRACT

A three-dimensional shape and color detecting apparatus that detects a three-dimensional shape of an object and a color thereof is provided with an illuminating system that emits light to illuminate the object, and a light receiving device that receives a reflected component of the light from the object. In this structure, the illuminating system is configured to emit the light from a surface having a predetermined area to the object.

19 Claims, 11 Drawing Sheets

IMAGE CAPTURED BY CCD CAMERA

THREE-DIMENSIONAL SHAPE AND COLOR DETECTING APPARATUS

BACKGROUND OF THE INVENTION

The present invention relates to a three-dimensional shape and color detecting apparatus employed, for example, in a three-dimensional scanner, capable of detecting a three-dimensional shape of an object and the color thereof.

Conventionally, three-dimensional shape and color detecting apparatuses for detecting a three-dimensional shape of an object and the color thereof based on light reflected by the object have been known.

An example of such apparatuses is disclosed in Japanese Patent Provisional Publication P2001-145126A (published on May 25, 2001). In this publication, the apparatus includes a laser unit which sequentially emits red, green and blue laser beams toward an object, and receives the reflected beams with a CCD (Charge Coupled Device). Then, based on an image formed on the CCD, distances to various portions on the object are obtained, thereby detecting the three-dimensional shape of the object. Further, in this apparatus, for each of the three color beams, the reflected components are received with the CCD, and detects the color of the object.

Another method is known in which a point light source (such as flash light emitted by a strobe device) is used to illuminate an object and the color thereof is determined.

When a light source is located at a predetermined fixed position, however, it is difficult to detects the color of the entire object, as described below.

FIG. 14 schematically shows a structure of the conventional shape detecting apparatus.

In the structure shown in FIG. 14, a point light source P30 and a CCD camera P11 are arranged on the left-hand side (which will also be referred to a front side of the object) of an object P3 to be detected. A ray RB of light emitted by the point light source P30 and incident on a point B at a side surface of the object P3 has a relatively large incident angle (i.e., an angle β formed between the ray RB and a normal NLA to the surface of the object at a point where the ray strikes the object P3) in comparison with the incident angle α of the ray RA striking a point A located at the front side of the object P3. DB1 and DB2 denote intensity distributions of reflection components at the points A and B, respectively.

Therefore, the quantity of light of reflection components of the light from the points A and B incident on the CCD camera P11 are considerably different. In particular, the quantity of light of the component from the point B to the CCD camera is very small, and a color of the object at the point B cannot be detected accurately.

There is suggested another method, in which the color and shape of the object are measured at various angles, and then based on the thus obtained measurement data, the shape and color of the object is determined. In this method, however, stepwise color variation which does not exist in reality may appear in the entire three-dimensional image obtained in accordance with the above method. This problem will be described in detail below.

When the entire three-dimensional image of the object P3 is generated, firstly, as shown in FIG. 15A, the three-dimensional shape and color of the object P3 are detected from its front side. With this condition, an area AR1 is measured. Then, as shown in FIG. 15B, the object P3 is rotated by 90 degrees, and the three-dimensional shape and color are detected from the left side of the object. Then, an area AR2 is measured. Similarly, the detection is performed from the rear side and the right side of the object with rotating the object P3 by 180 degrees and 270 degrees, respectively. Then, the images thus obtained are synthesized to form a final image of the object P3 as shown in FIG. 16.

In the three-dimensional shape of the object P3 shown in FIG. 16, a left-hand side portion SLH of a line C represents an image when the object P3 is oriented as shown in FIG. 15A, and a right-hand side portion SRH of the line C represents an image when the object P3 is oriented as shown in FIG. 15B.

As aforementioned, in the conventional three-dimensional shape and color detecting apparatus, the color of a surface which faces aside the light source cannot be detected correctly. Therefore, when the object P3 is oriented as shown in FIG. 15A, the color of a portion in the vicinity of the line C cannot be detected correctly. Since the image of the left-hand side portion of the line C is detected when the object P3 is oriented as shown in FIG. 15A, the color CLH of this portion of the finally obtained three-dimensional image (shown in FIG. 16) is different from the true color of this portion of the object P3.

On the other hand, the color CRH of the right-hand side area of the line C is detected when the object P3 is oriented as shown in FIG. 15B. Therefore, it is expected that the color of the image of this portion of the three-dimensional image correctly represents the true color of this portion of the object P3.

As above, there is a step of color difference at the border line C.

SUMMARY OF THE INVENTION

The present invention is advantageous in that a three-dimensional shape and color detecting apparatus capable of detecting the color of the object over the entire area of the three-dimensional shape can be provided.

According to an aspect of the invention, there is provided a three-dimensional shape and color detecting apparatus that detects a three-dimensional shape of an object and a color thereof, which is provided with an illuminating system that emits light to illuminate the object, and a light receiving device that receives a reflected component of the light from the object. In this structure, the illuminating system is configured to emit the light from a surface having a predetermined area to the object.

Optionally, the light receiving device may include a two-dimensional image capturing element.

Further optionally, the surface emitting the light may include, when viewed from the object side, portions facing each other with the light receiving device located therebetween.

In an embodiment, a solid angle formed by the predetermined area with respect to a center of the object is one steradian or larger.

Preferably, the light illuminating the object may include diffused light. Optionally, the diffused light is white light.

Further optionally, the illuminating system may include a light source, and a light diffusing member that diffuses the light emitted by the light source.

In this case, the light source may be arranged, when viewed from the object side, behind the light diffusing member. Alternatively or optionally, the light source may be arranged, when viewed from the object side, on a near side of the light diffusing member. In an embodiment, the light source includes a plurality of linear fluorescent lamps.

The detecting apparatus may include a rotary table on which the object is held.

Yet optionally, the detecting apparatus may include a light shielding member that prevents ambient light from being incident on the object.

Still further, the detecting apparatus may be provided with a slit light beam emitting system that emits a slit beam to the object, and a three-dimensional shape detecting system that detects the three-dimensional shape of the object in accordance with an image of an object at a portion illuminated by the slit beam.

Optionally, the light receiving device receives the image of the illuminated portion of the object.

Further optionally, light emission of the illuminating system is inhibited when the three-dimensional shape of the object is measured, and emission of the slit beam of the slit light beam emitting system is inhibited when the color of the object is measured.

The detecting apparatus may further include a scanning system that moves the slit beam emitting system and the light receiving device relative to the object in a direction perpendicular to an extending direction of the slit beam so as to scan the object with the slit beam.

According to another aspect of the invention, there is provided with a three-dimensional shape and color detecting apparatus that detects a three-dimensional shape of an object and a color thereof, which is provided with a slit beam emitting system that emits a slit beam to the object, cross section of the slit beam being extending in a predetermined direction, an illuminating system that emits illuminating light having substantially an even intensity distribution toward entire area of the object, and a light receiving device that receives an illuminated portion of the object. In this configuration, when the three-dimensional shape of the object is detected, the slit beam is emitted to the object and the reflected beam is received by the light receiving device, and when the color of the object is detected, the illuminating light is emitted to the object and the reflected beam is received by the light receiving device.

Optionally, the illuminating system may include a surface light source. Further, a solid angle formed by an area of the surface light source with respect to a center of the object may be at least one steradian.

Further optionally, the detecting apparatus may include a scanning system that moves the slit beam emitting system and the light receiving device relative to the object in a direction perpendicular to an extending direction of the slit beam so as to scan the object with the slit beam.

Furthermore, the apparatus is provide with a controller that controls the illuminating system and the slit beam emitting system to operate. The controller inhibits light emission of the illuminating system when the three-dimensional shape of the object is measured, and inhibits emission of the slit beam of the slit light beam emitting system when the color of the object is measured.

BRIEF DESCRIPTION OF THE ACCOMPANYING DRAWINGS

FIG. 1 schematically shows an entire structure of a three-dimensional shape and color detecting apparatus according to a first embodiment of the invention;

FIG. 2 schematically shows the structure of the three-dimensional shape and color detecting apparatus according to the first embodiment viewed from the top;

Figure 8:
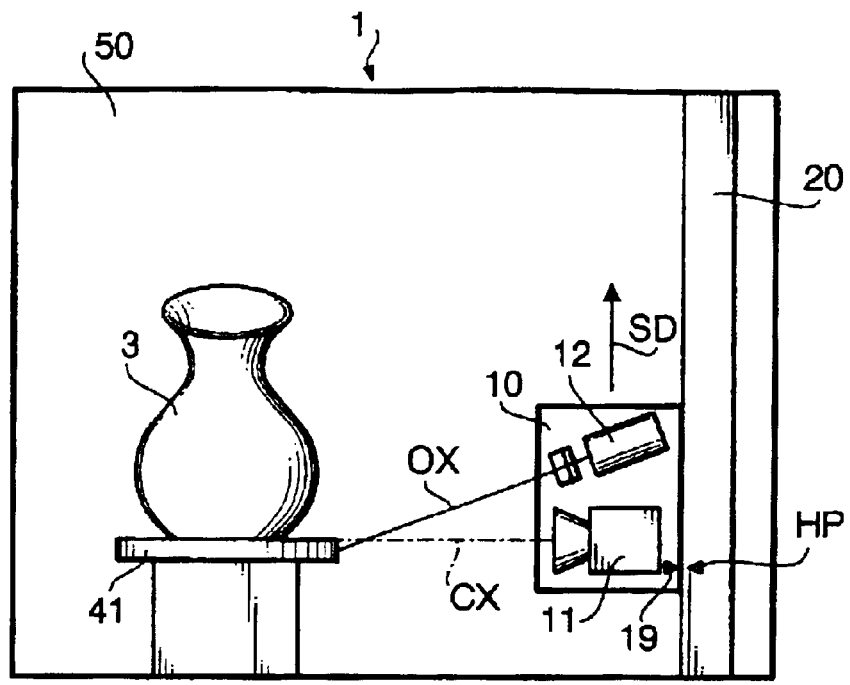
Figure 9:
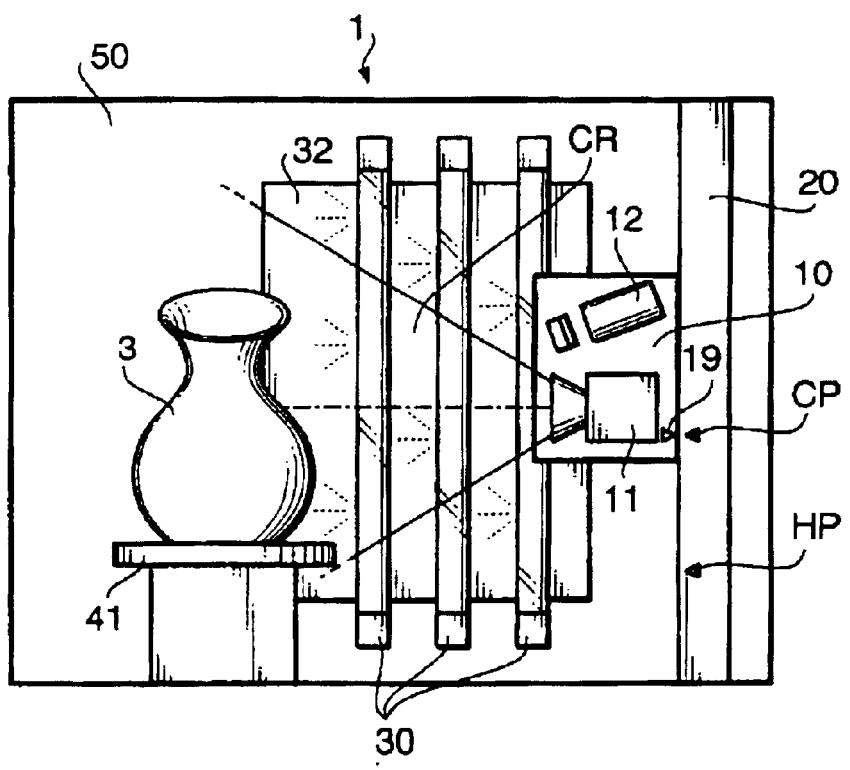
Figure 10:
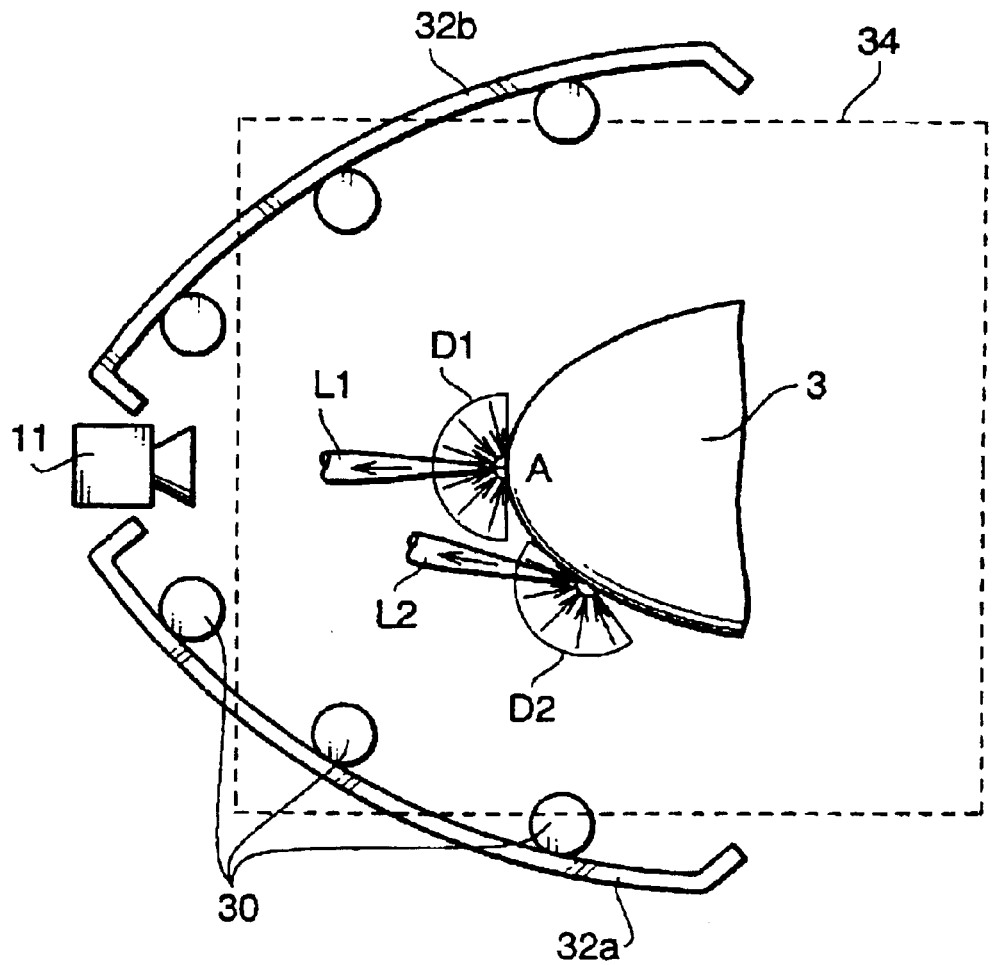
Figure 11:
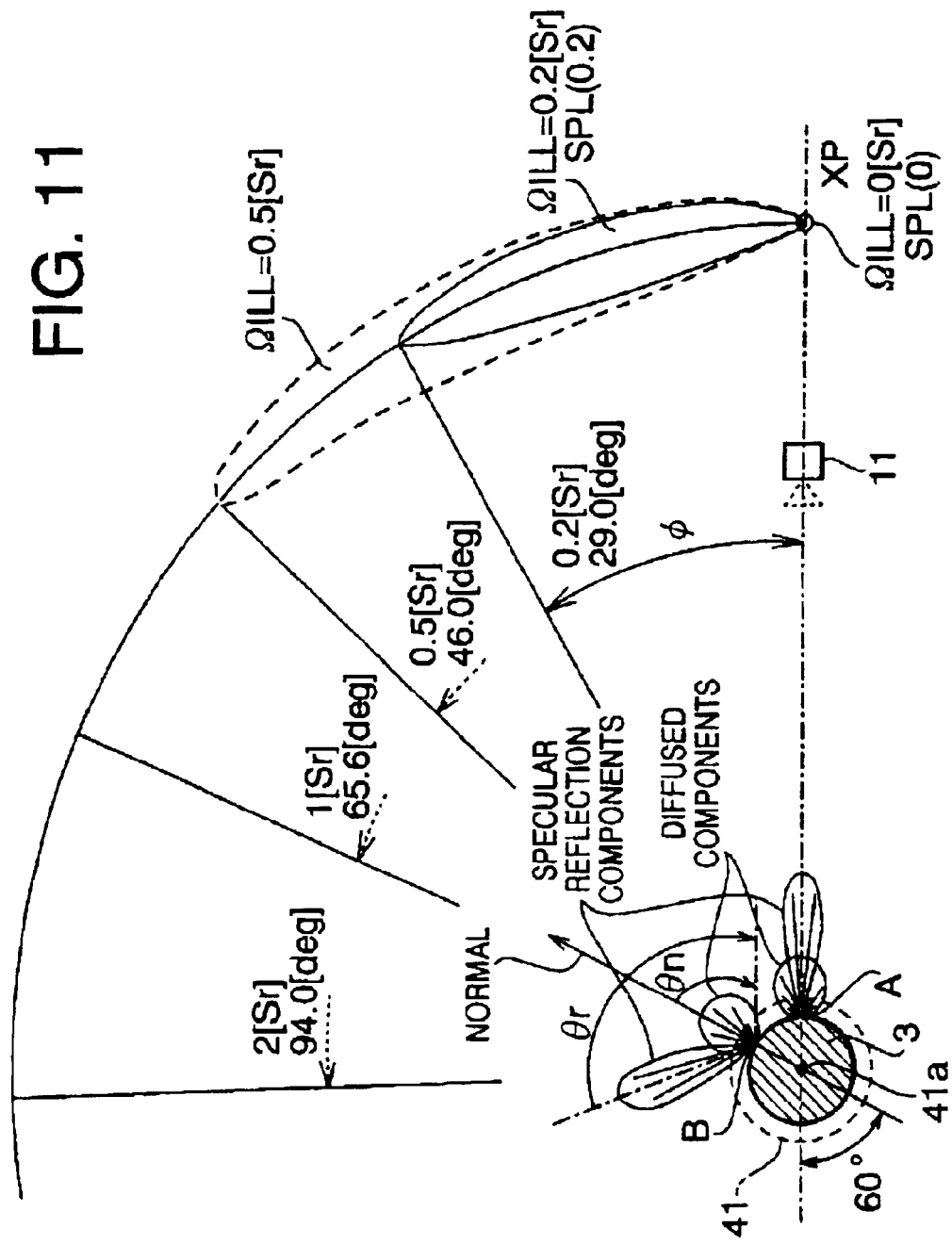
Figure 12:
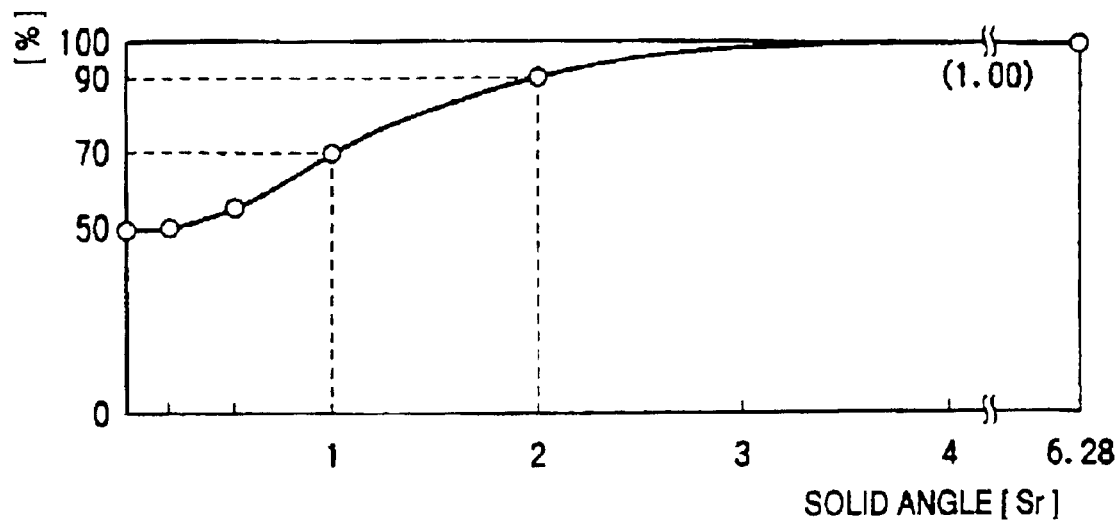
Figure 13:
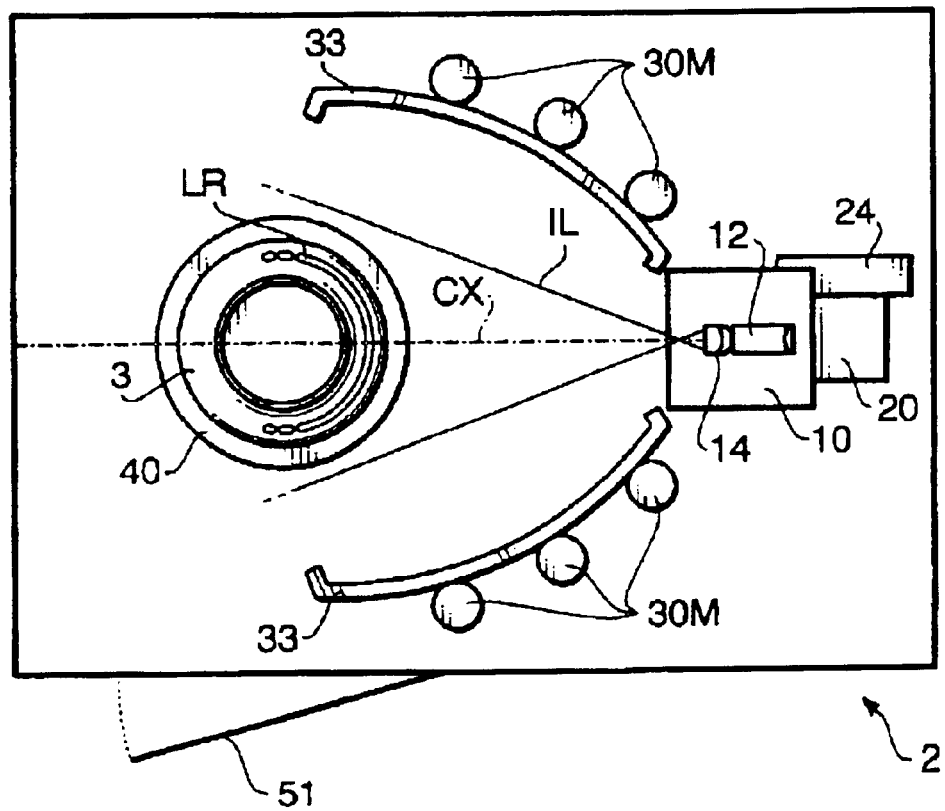
Figure 14:
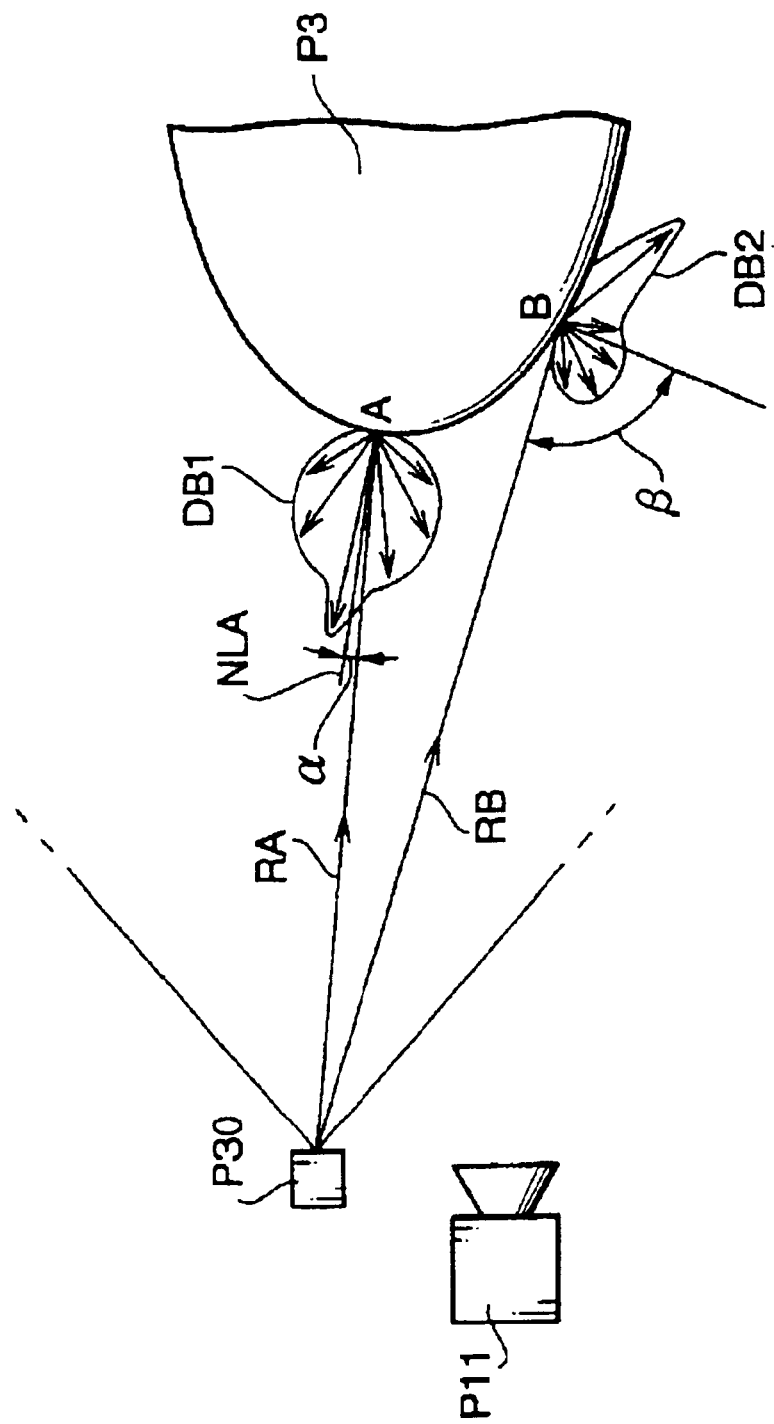
Figure 15A:
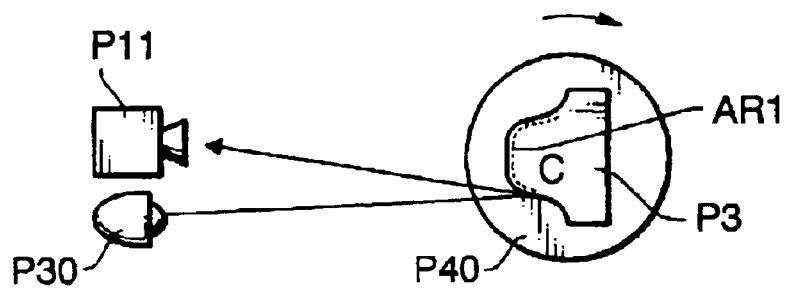
Figure 15B:
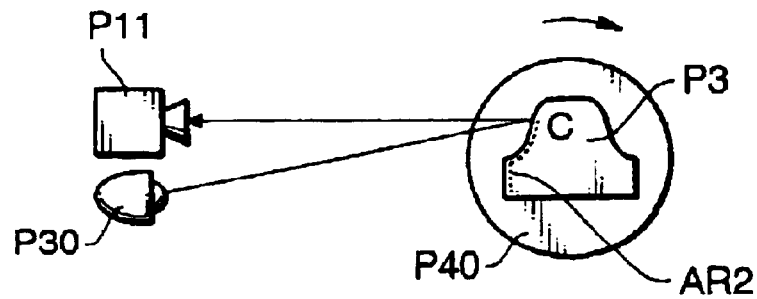
Figure 16:
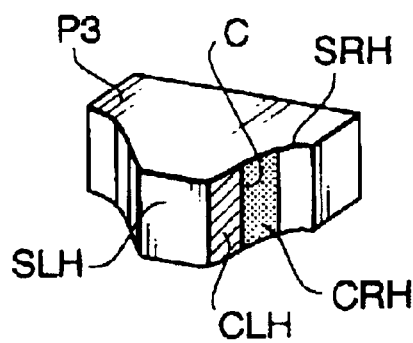

FIG. 8 schematically shows the three-dimensional shape and color detecting apparatus according to the first embodiment when a measurement head is located at a home position;

FIG. 9 schematically shows the three-dimensional shape and color detecting apparatus according to the first embodiment when a measurement head is located at an image capturing position;

FIG. 10 is a chart illustrating light quantity distribution of light reflected on the object;

FIGS. 11 and 12 illustrate a relationship between a solid angle and light quantity distribution on the object;

FIG. 13 schematically shows an entire structure of a three-dimensional shape and color detecting apparatus according to a second embodiment;

FIGS. 14 and 15 illustrate a conventional method of detecting three-dimensional shape and color; and FIG. 16 shows a three dimensional image detected by a conventional three-dimensional shape and color detecting apparatus.

DETAILED DESCRIPTION OF THE EMBODIMENTS

Hereinafter, three-dimensional shape and color detecting apparatuses according to embodiments will be described with reference to the accompanying drawings.

First Embodiment

Figure 1:
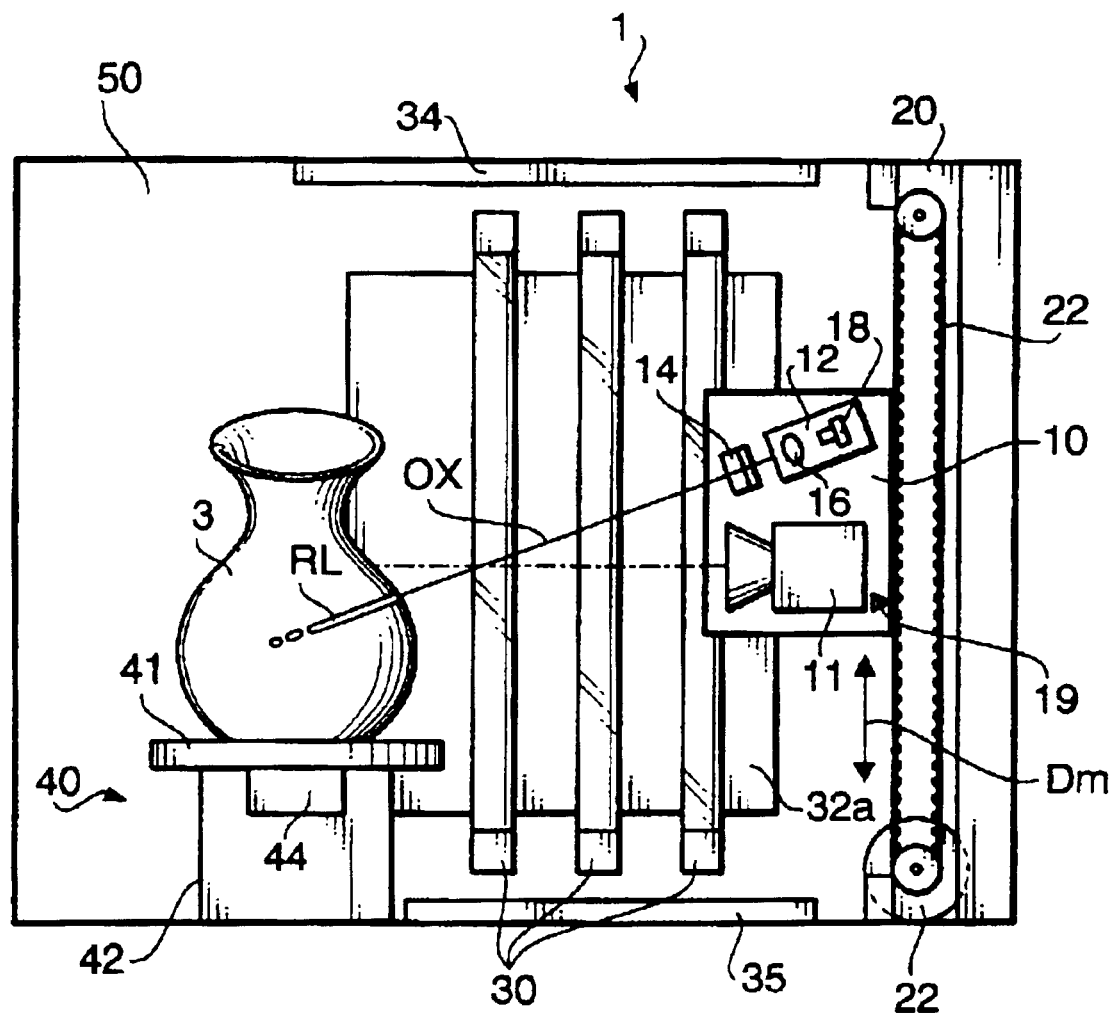
Figure 2:
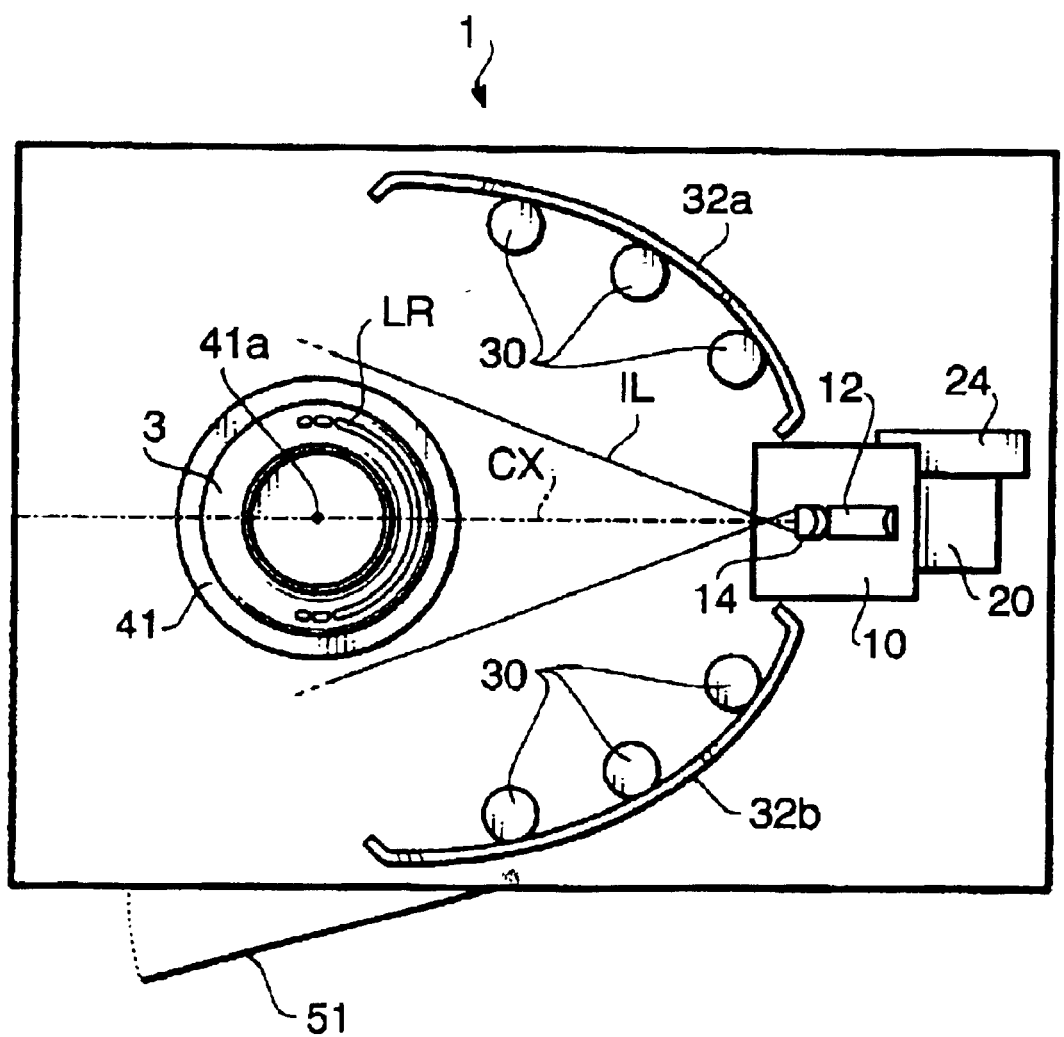

FIGS. 1 and 2 schematically shows an entire structure of a three-dimensional shape and color detecting apparatus 1 according to a first embodiment of the invention.

According to the first embodiment, the three-dimensional shape and color detecting apparatus (hereinafter, simply referred to as a shape detecting apparatus) a casing 50. The casing 50 accommodates a measuring head 10, which measures three-dimensional shape and color of an object 3, a linear stage 20 which moves the measuring head 10 in an upside and down side direction (indicated by arrow Dm) in FIG. 1, a table 40 on which the object 3 is placed, and an illuminating system that includes side diffusing plates 32*a* and 32*b*, upper diffusing plate 34, lower diffusing plate 35, linear fluorescent lamps 30. The casing 50 is formed of light shielding members, which prevents ambient light from entering inside the casing 50. Preferably, each of the fluorescent lamps 30 emits white light.

It should be noted that, according to the first embodiment, the direction Dm in which the head 10 moves coincides with the up-and-down direction when the detecting apparatus 1 is in use. However, the invention is not limited to this configuration, and relative positions of components inside the casing 50 is similar, the head 10 can be moved in another direction, for example, in a horizontal direction, when the detecting apparatus is in use.

The measuring head 10 includes a laser unit 12. The laser unit 12 includes a laser diode 18 which emits a red laser beam having a wavelength of 650 nm, a collimating lens 16 that collimates the laser beam emitted by the laser diode 18, and a cylindrical lens 14 that has a positive power in the direction perpendicular to a plane of FIG. 1. With the power of the cylindrical lens 14, the laser beam is converged in the direction perpendicular to the plane of FIG. 1, a line-shaped beam (hereinafter occasionally referred to as a slit beam) is incident on the object 3.

The measuring head 10 further includes a color CCD camera 11 capable of capturing a two-dimensional color image. On a side surface (on a near side surface along a viewing direction of FIG. 1) of the measuring head 10, a measuring head reference point 19 is marked at a position close to the linear stage 20.

The measuring head 10 is secured to the linear stage 20, which moves the measuring head 10, in the direction Dm, with a driving force transmitted from a belt-driving motor 24 through a driving belt 22.

The table 40 includes a base 42, a disk-shaped rotary stage 41. The rotary stage 41 is driven, by a stage driving motor 44, about a rotary axis 41*a* that passes the center of the disk-shape of the rotary stage 44 and extends in a direction perpendicular to the top surface of the rotary stage 41. According to the embodiment, the rotary axis 41*a* extends in the up-and-down direction in FIG. 1. The top surface of the rotary stage 41 is formed to be a white light-diffusing surface which diffuses light incident thereon.

As best shown in FIG. 2, the side diffusing plates 32*a* and 32*b* are formed to be a gently curved plate members, respectively. The side diffusing plates 32*a* and 32*b* are arranged such that concave surfaces, which are the diffusing surfaces, face the table 40, with the measuring head 10 located therebetween. The side diffusing plates 32*a* and 32*b* are formed of white opal glass or white ABS (acrylonitrile-butadiene-styrene) resin, and surface-roughness thereof is adjusted such that Rz=1 $\mu$m.

The upper diffusing plate 34 and the lower diffusing plate 35 are planar plate members having white diffusing surfaces. They are made of the same material as the side diffusing plates 32*a* and 32*b*, and secured to inner top surface and inner bottom surface of the casing 50.

There are six linear fluorescent lamps 30: three are arranged on the inner side of the side diffusing plate 32*a*; and the other three on the inner side of the side diffusing plate 32*b*. Each of the three fluorescent lamps are arranged at the same intervals.

The casing 40 is a box-shaped casing, and shields the ambient light from entering inside the casing 50. On a side surface of the casing 50 (on the lower side surface in FIG. 2), a door 51 is formed. By opening the door 51, the object can be put in and/or withdrawn from the casing 50.

According to the first embodiment, with respect to the center of the object 3, which is the rotary axis 41*a*, the linear fluorescent lamps 30, the side diffusing plates 32*a* and 32*b*, the upper diffusing plate 34 and the lower diffusing plate 35 form a solid angle of three steradian.

In FIG. 2, LR represents a portion where the beam strikes the object 3, IL denotes a range in which the beam diverges, and CX denotes an optical axis of a camera.

Figure 3:
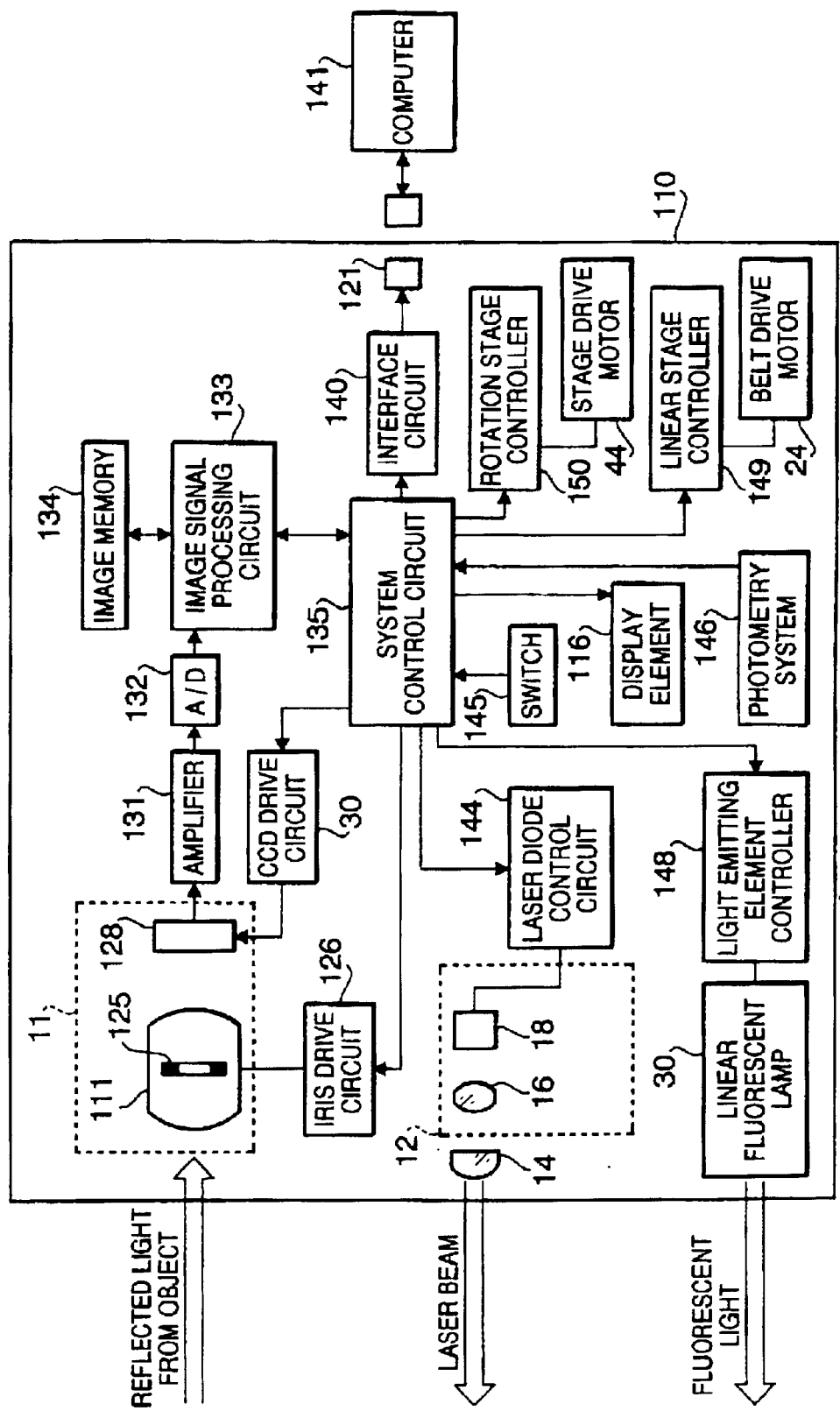
FIG. 3 shows an electrical configuration of the three-dimensional shape and color detecting apparatus according to the first embodiment.

FIG. 3 shows an electrical configuration of the detecting apparatus 1 according to the first embodiment.

The color CCD camera 11 includes an imaging lens 111 having an iris 125 therein, which defines an aperture. On the optical axis of the imaging lens 111, a CCD 128 is provided. An image of the object 3 is formed on the light receiving surface of the CCD 128 by the imaging lens 111, and electrical charges corresponding to the intensity of light are generated. Accumulation and readout of the electrical charges in the CCD 128 are controlled by a CCD drive circuit 130. The electrical charges read out from the CCD 128, i.e., the image signal output by the CCD 128, is amplified by an amplifier 131, and converted from an analog signal to a digital signal by an A/D (analog-to-digital) converter 132. The converted digital image signal is processed (e.g., gamma correction and the like) by an image signal processing circuit 133, and temporarily stored in an image memory 134. The operations of the CCD drive circuit 130 and the image signal processing circuit 133 are controlled by a system control circuit 135.

The system control circuit 135 is connected with an interface circuit 140, which is connected with an interface connector 121. By connecting a personal computer of the like with the detecting device 1 with an interface cable, the image signal stored in the image memory 134 can be transmitted to the computer or the like.

The laser unit 12 includes the laser diode 18 and the collimating lens 16. Further, in front of the collimating lens, the cylindrical lens 14 is provided.

The laser beam emitted by the laser diode 18 is incident on the object 3 through the collimating lens 16. As described above, the collimating lens 16 collimates the laser beam, and the cylindrical lens 14 converges the collimated laser beam only in one direction. By the power of the cylindrical lens 14, the cross-sectional shape of the laser beam incident on the object 3 is line-shaped (i.e., the slit beam is formed) and is used for detecting the three-dimensional shape of the object 3. A light emission operation of the laser diode 18 is controlled by a laser diode controlling circuit 144. It should be noted that the invention need not be limited to the above configuration, and, for example, the collimating lens 16 and the cylindrical lens 14 may be replaced with a single toric lens having the function of both lenses.

To the system controlling circuit 135, a fluorescent lamp controlling circuit 148 for controlling the linear fluorescent lamps 30, a linear stage controlling circuit 149 for controlling the belt driving motor 24 of the linear stage 20, and a rotary stage controlling circuit 150 for controlling the stage driving motor 44 are connected.

Further, the system controller 135 is connected with a photometry system 146 used for judging whether the illumination is necessary when a normal two-dimensional image is captured, a group of switches 145 including a release switch 115, a mode changing dial 117, a V/D mode changeover switch 118, and an LCD (liquid crystal display) panel 116.

Figure 4:
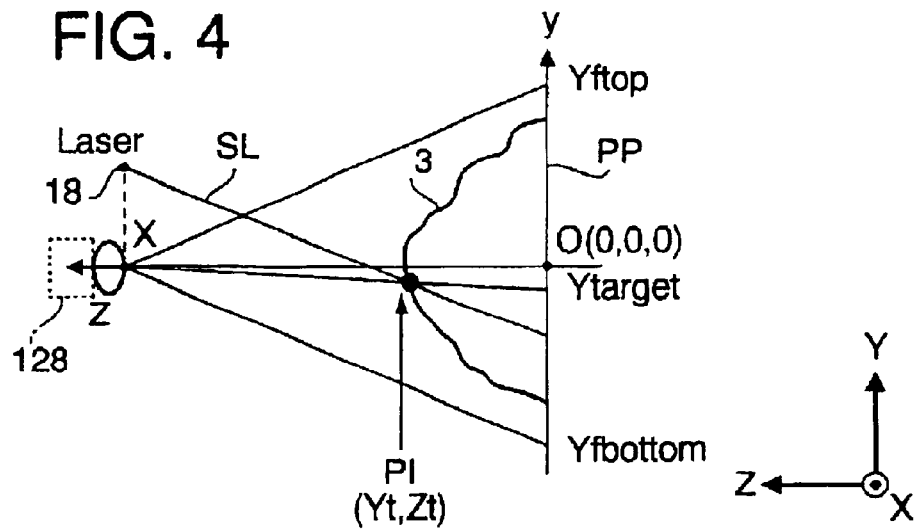
FIGS. 4–6 are charts explaining principle of detecting the three-dimensional shape.
Figure 5:
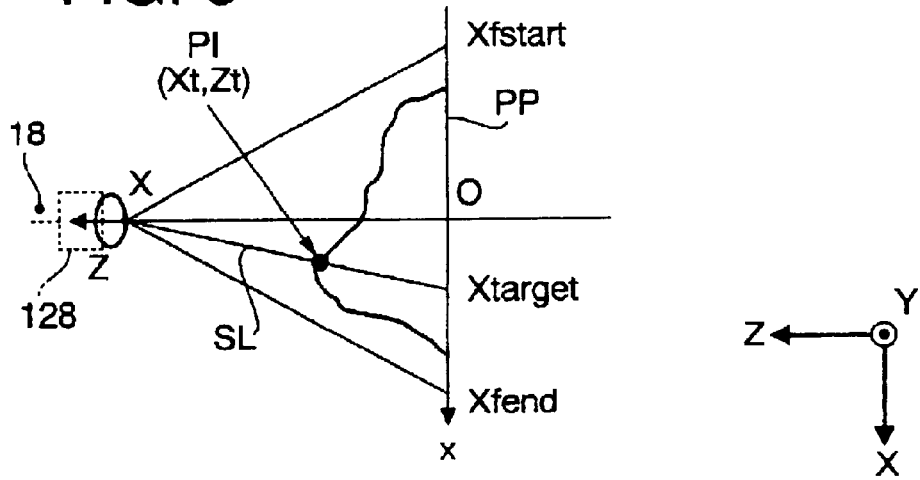
Figure 6:
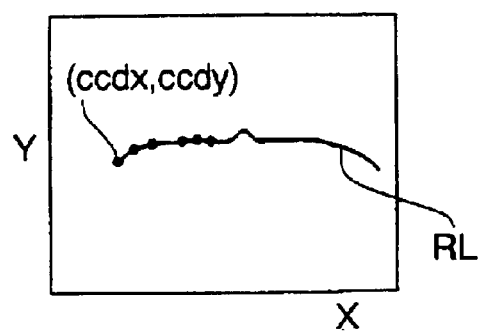

Next, principle of measuring a three-dimensional shape of the object using the three-dimensional shape and color detecting apparatus 1 will be described. FIGS. 4–6 are charts explaining principle of detecting the three-dimensional shape.

FIG. 4 shows a positional relationship of the laser diode 18, the CCD 128 and the object 3 when viewed in a transverse direction (which is a direction from the backside of FIG. 1 to the front side, normal to the plane of FIG. 1). FIG. 5 shows the above positional relationship, when viewed from the top (i.e., from the upside of FIG. 1). FIG. 6 shows an image formed by an image of a portion of the object 3 illuminated by the incident beam.

In FIGS. 4 and 5, an XYZ rectangular coordinate system is indicated. For the explanation purpose, the coordinates of the center of the light receiving surface of the CCD 128 are assumed to be (0, 0, 380) and the coordinates of the laser diode 18 are (0, 100, 380). The Y-coordinate at which the beam emitted by the laser diode 18 intersects an X-Y plane (Z=0) is assumed to be −26.67. Further, the field of view of the camera on the light receiving surface of the CCD 128 ranges from Xfstart to Xfend in the X-axis direction, and from Yftop to Yfbottom in the Y-axis direction.

Further, the coordinates of a target point PI (which is a point within an area on the object illuminated by the incident beam) on the object 3 are (Xt, Yt, Zt), and the coordinates of the projection of the target point on the X-Y plane (Z=0) viewed from the center of the light receiving surface of the CCD are (Xtarget, Ytarget, 0). The coordinates of the image of the target point on the image captured by the CCD 128 are (ccdx, ccdy).

A method of determining three-dimensional coordinates of the target point will be described.

In accordance with geometrical relationship indicated in FIGS. 4 and 5, the coordinates (Xt, Yt, Zt) are represented by equations (1) through (3).

$$Yt=(1/3)Z-2.67 \quad (1)$$

$$Yt=-(Y\text{target}/380)Zt+Y\text{target} \quad (2)$$

$$Xt=-(X\text{target}/380)Zt+X\text{target} \quad (3)$$

Xtarget and Ytarget are expressed by equations (4) and (5) using other parameters.

$$X\text{target}=Xf\text{start}+(ccdx/640)\cdot(Xf\text{end}-Xf\text{start}) \quad (4)$$

$$Y\text{target}=Yf\text{stop}-(ccdy/480)\cdot(Yf\text{top}-Yf\text{bottom}) \quad (5)$$

Using the relationship defined by equations (1) through (5), form the coordinates (ccdx, ccdy) on the image captured by the CCD 128, the three-dimensional coordinates (Xt, Yt, Zt) of the target point can be obtained. That is, the three-dimensional shape of the object 3 at the portion where the laser beam is incident can be measured.

Further, by moving the laser diode 18 and the CCD 128 in the Y-axis direction to scan the light beam on the surface of the object, and repeating the above-described measurements, the three-dimensional shape of the entire object 3 can be measured.

Next, a procedure of measuring the three-dimensional shape and the color on the object 3 will be described with reference to FIGS. 7 and 8.

Figure 7:
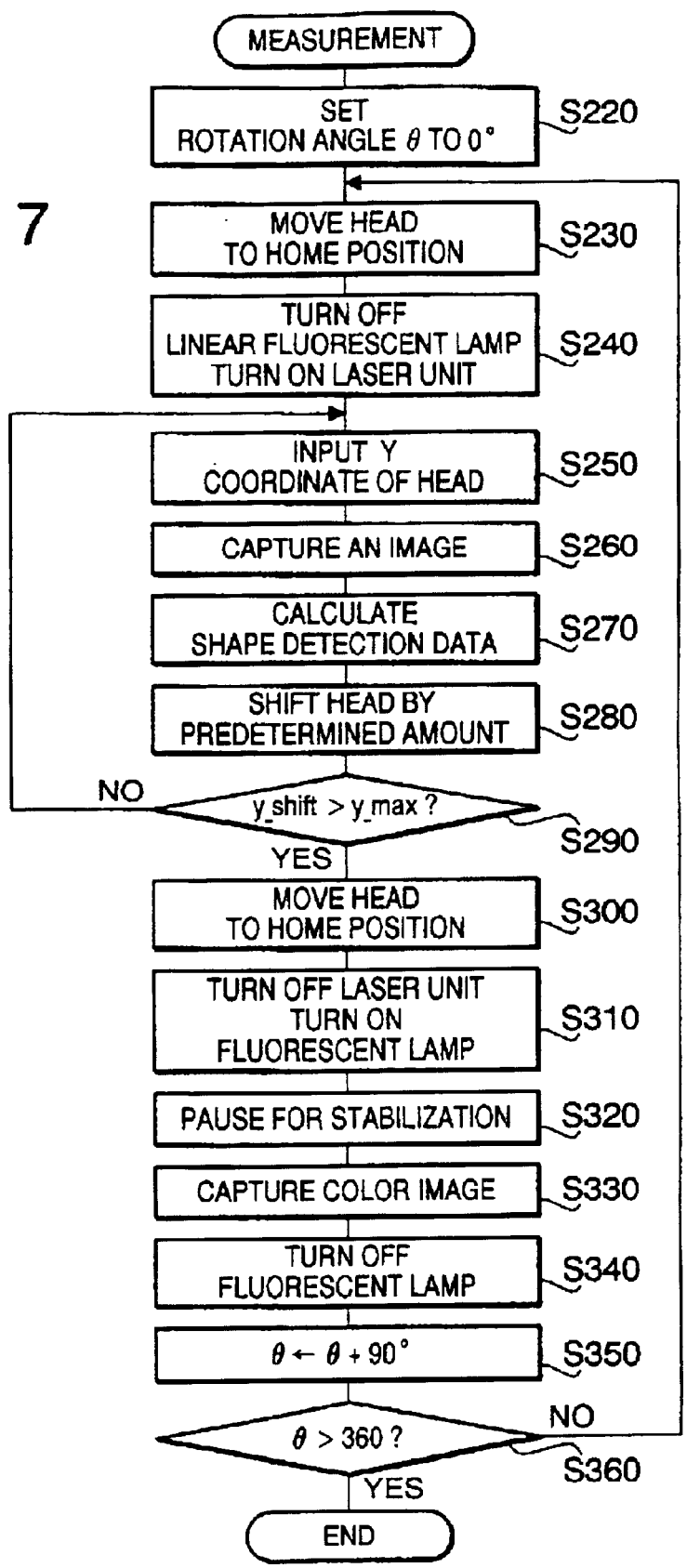
FIG. 7 is a flowchart illustrating a measurement procedure.

FIG. 7 is a flowchart illustrating a measurement procedure.

Initially, a user of the detecting apparatus 1 places the object on the rotary stage 41. Then, the user operates the computer 141 to input a command instructing that the measurement is performed. The procedure shown in FIG. 7 is initiated when the computer 141 has issued the command instructing the initiation of the measurement procedure.

In S220, a variable θ, which represents a rotary position of the rotary stage 41 is initialized (i.e., set to 0°). Then, the measurement head 10 is moved to the home position (S230). FIG. 8 schematically shows the detecting apparatus 1 when the measurement head 10 is located at a home position HP. The home position is the lower limit of a movable range of the measurement head 10. When the measurement head 10 is located at the home position, the optical axis OX of the laser unit 12 passes below the object 3 as shown in FIG. 8.

In S240, the linear fluorescent lamps 30 are turned OFF, and the laser unit 12 is turned ON. Then, in S250, the Y coordinate of the measurement head 10 (i.e., y_shift) is input to the system control circuit 135. It should be noted that he Y coordinate is a coordinate in the up-and-down direction in FIG. 8.

In S260, using the color CCD camera 11, an image of the object 3 is captured, which is stored in the image memory 134 as aforementioned. The image is formed by the beam emitted by the laser unit 12 and reflected by the object 3 of the table 40. The image has, as exemplary indicated in FIG. 6, an image elongated in the X-axis direction.

In S270, based on the image captured in S260, the three-dimensional shape data of the object 3 is calculated. That is, in accordance with the relationships (1) through (5) described above, the three dimensional shape (Xt, Yt, Zt) of a portion the object 3 illuminated by the laser beam is calculated in accordance with the coordinates (ccdx, ccdy).

In S280, the measurement head 10 is raised upward (i.e., in the direction where Y coordinate increases) by a predetermined amount. Specifically, the linear stage control circuit 149 controls the belt drive motor 24 of the linear stage 20 by a predetermined amount. Since the Y coordinate increases, the Y coordinate (y_shift) the system control circuit retains is increased by a predetermined amount to update the same.

In S290, it is judged whether the position of the measurement head 10 has reached the uppermost position thereof (i.e., whether y_shift exceeds the maximum value). If the Y coordinate (y_shift) exceeds the maximum value (260 mm) (S290: YES), control proceeds to S300. If the Y coordinate is equal to or smaller than the maximum value (260 mm) (S290: NO), control returns to S250.

In S300, the measurement head 10 is located at an image capturing position (where y_shift=130 mm). The image capturing position is, as shown in FIG. 9, a central position CP within the movable range of the measurement head 10.

When the measurement head 10 is located at the image capturing position, the object 3 is located at the substantially center of an image capturing field CR of the color CCD camera 11.

In S310, the laser unit 12 is turned OFF, and the linear fluorescent lamps are turned ON. At this stage, as shown in FIG. 10, a portion of the surface of the object 3 facing the color CCD camera 11 receives white light from the linear fluorescent lamps 30, the side diffusing plates 32a and 32b, the upper diffusing plate 34 and the lower diffusing plate 35.

In S320, control pauses for a predetermined period of time (e.g., two seconds). The predetermined period is determined so that control proceeds to the following steps after the light emission by the fluorescent lamps 30 is stabilized.

In S330, a color image of the object 3 is captured using the color CCD camera 11. The captured image is stored in the image memory 134. The color of the object 3 will be determined based on the color image stored in the image memory 134.

In S340, the linear fluorescent lamps 30 are turned OFF.

In S350, the rotary stage 31 is rotated by 90° (i.e., the value of θ is increased by 90°). That is, the rotary stage drive circuit 150 transmits a signal to drive the stage drive motor 44 by a predetermined amount so that the rotary stage 31 is rotated by 90°.

In S360, it is judged whether θ has reached 360°. If θ is greater than 360°, the procedure shown in FIG. 7 is terminated. If θ is equal to or smaller than 360°, control returns to S230.

As can be appreciated from the foregoing, according to the detecting apparatus 1 according to the embodiment, the linear fluorescent lamps 30, the side diffusing plates 32a and 32b, the upper diffusing plate 33 and the lower diffusing plate 35 area arranged to surround the object 3. Therefore, on the surface of the object 3, light is incident from a relatively wide area.

Accordingly, a relatively wide area of the surface of the object 3 receives substantially even amount of light from the linear fluorescent lamps 30. Therefore, the light having a sufficient quantity is reflected by a relatively wide range of the surface of the object 3, and is incident on the color CCD camera 11. For example, in FIG. 10, the quantity of light L2 reflected at point B and is incident on the color CCD camera 11 is substantially the same as the quantity of light L1 reflected at point A and is incident on the color CCD camera 11. Accordingly, the light has sufficient quantity to determine the color of the object 3 correctly over a relatively wide area of the object 3. D1 and D2 denote the intensity distributions of the light incident on the points A and B, respectively.

In particular, according to the detecting apparatus according to the first embodiment, viewed from the center 41a of the measured area, the light source (i.e., the fluorescent lamps 30, the side diffusing plates 32a and 32b, the upper diffusing plate 33 and the lower diffusing plate 35) have a solid angle that is one steradian or more (three steradian, according to the above-described embodiment). Thus, the above-explained advantages are significant.

FIG. 11 is a plan view showing a positional relationship of the object 3, the rotary stage 41, the color CCD camera 11, an the light source (the linear the fluorescent lamps 30, the side diffusing plates 32a and 32b, the upper diffusing plate 33 and the lower diffusing plate 35). In this chart, cases when different solid angles (0.2–2 steradian), with respect to the center 41a of the measured area, are used are indicated.

In this chart, the light source is modeled (represented) by a spherical surface light source. The area of the spherical light source SPL is defined to extend, with forming a circular shape, from a point XP on the optical axis OX of the color CCD camera 11 toward a point B side area along a hemisphere in accordance with a solid angle ΩILL. In FIG. 11, cases where ΩILL equals to 0.2, 0.5, 1 and 2 [sr] are indicated. Numerals with a unit [deg] represents the angular width Φ [deg] of the spherical light source SPL viewed from the top.

It should be noted that the angular width Φ [deg] and the solid angle ΩILL has the following relationship.

$$\Phi = 2*\arccos(1-(\Omega ILL/2\pi))[sr]$$

In FIG. 11, the spherical light source for ΩILL=0 [sr] is indicated by a circle SPL(0), that for ΩILL=0.2 [sr] is indicated by a elongated oval shape SPL(0.2) by a solid line, and that for ΩILL=0.5 [sr] is indicated by broken lines.

The object 3 is also modeled as a simple spherical body. The object 3 is on the optical axis OX of the color CCD camera 11. A point on the surface of the object 3 and on the optical axis OX is represented by point A in FIG. 11. Point B is also on the surface of the object 3, but not on the optical axis OX. A line connecting the point B and the center of the sphere (i.e., object 3) forms an angle of 60° with respect to the optical axis OX.

A diffusing characteristic on the surface of the object 3 is configured such that half of diffused light is a specular reflection component which distributes proportional to $\cos^2(\theta r)$, θr being a deviated angle with respect to the specular reflection direction, and that the remaining half the diffused light is the completely diffused component which distributes proportional to $\cos(\theta n)$, θn being a deviation angle with respect to the normal to the surface of the object 3.

With the above modeling, a ratio of the brightness at point A to that at point B viewed from the color CCD camera 11 can be calculated. When the light source is considered to be an ideal point source, i.e., the spherical light source of ΩILL=0 [sr], the solid angle ΩILL of the diffused illumination viewed from the object 3 is zero. In this case, if the intensities of the reflected light is normalized with the intensity of the light reflected by the point A and incident on the CCD camera 11 is regarded as one, then, regarding the point B, the specular reflection components incident on the color CCD camera 11 is zero since the deviation angle θr exceeds 90°. The complete diffused component directed from the point B to the color CCD camera 128 is 0.5, since the deviation angle θn is 60° and therefore, (distribution ratio for the complete diffused component)*(diffused component)/(direction cosine)=0.5*0.5/cos(θn)=0.5. That is, the brightness at the point B is 50% of the brightness at the point A. Therefore, according to the conventional method, although the color of the entire surface of the object 3 is the same, the brightness at the point B is detected to be lower than the brightness at the point A, and thus the accurate color detection can not be performed.

If the solid angle ΩILL is relatively wide to range from 0 to 6.28, with a numerical analysis simulation, the intensities of the light returning from the points A and B can be calculated, respectively.

That is, values of the specular component and complete diffused component directed from a part of the wide surface light source to the color CCD camera 11 are obtained in accordance with the above-described procedure based on the deviation angle θr with respect to the specular reflection direction and the deviation angle θn with respect to the normal to the surface, and by integrating the thus obtained values over the entire area of the surface light source, the intensities of the light returning from the points A and B to the color CCD camera 11 can be calculated, respectively.

FIG. 12 is a graph showing a change of a ratio of the brightness of the point B (the intensity of the light directed from a unit area at the point B) to the brightness of the point A (the intensity of the light directed from a unit area at the point A) when the solid angle viewed from the center 41a of the measured area changes.

As shown in FIG. 12, the solid angle viewed from the center 41a of the measured area is one steradian or greater, the brightness of the point B is 70% of that of the point A or greater, which is sufficient to measure the color of the object 3. Since the solid angle is one or greater, as shown in FIG. 12, the ratio of the brightness of the point B to the brightness of the point A is 70% or greater. Therefore, for a relatively wide area on the surface of the object 3 (at least including the point B), the color of the object 3 can be accurately measured.

The detecting apparatus 1 employs the two-dimensional imaging element (in the above-described embodiment, the CCD is used). Therefore, measurement can be performed for a relatively wide range. Further, the measurement of the color can be performed in a relatively short period of time.

Furthermore, in the above-described embodiment, as a light source, the linear fluorescent lamps 30, the side diffusing plates 32a and 32b, the upper diffusing plate 33 and the lower diffusing plate 35 are employed, and white light is used for illuminating the object 3. Therefore, in comparison with an apparatus using sequentially emitted red, green and blue beams for colorimetry, the measurement can be performed in a shorter period of time.

Furthermore, with use of the side diffusing plates 32a and 32b, the upper diffusing plate 33 and the lower diffusing plate 35, the object is illuminated with substantially evenly distributed light. Therefore, the brightness of the surface of the object 3, viewed through the color CCD camera 11, is substantially even over a relatively wide area. As a result, over a wide area of the surface of the object 3, the color can be measured correctly. Further, since the number of light emitting elements is relatively small, the structure of the light source as well as the detection apparatus 1 can be simplified.

Since the object is place on the rotary stage 41, and can be rotated, the three-dimensional shape and color thereof can be measured over the entire circumference of the object 3.

The casing 50 is made of the light shielding member, which prevents ambient light from entering the casing 50. Therefore, the beam used for measuring the three-dimensional shape strikes the object at a high contrast, thereby the three-dimensional shape measurement being performed accurately.

Further, since the ambient light is shielded, when the color of the object 3 is measured, uneven brightness change or change of hue due to the ambient light does not occur. Therefore, the color measurement can be performed accurately.

According to the above-described embodiment, when the three-dimensional shape is measured, the fluorescent lamps 30 are turned OFF. Therefore, when the slit beam strikes the surface of the object 3, its contrast is not lowered by the light emitted by the fluorescent lamps 30. Accordingly, the three-dimensional shape measurement can be performed accurately.

Further, when the colorimetry is performed, the laser unit 12 is turned OFF. Accordingly, the brightness on the surface of the object 3 is maintained evenly. Therefore, the color of the object can be measured accurately.

Second Embodiment

FIG. 13 schematically shows an entire structure of a three-dimensional shape and color detecting apparatus 2 according to a second embodiment.

The structure of the detecting apparatus 2 is similar to that of the first embodiment except that the liner fluorescent lamps 30M are arranged behind the side diffusing plates 32a and 32b (on an opposite side of the object 3 with respect to the diffusing plates 32a and 32b).

According to the detecting apparatus 2, the light emitted by the linear fluorescent lamps 30 is not directly incident on the object 3, and only the diffused light illuminates the object surface. Therefore, evenness of the light illuminating the object 3 is improved in comparison with the first embodiment, and the color measurement can be performed more accurately.

It should be noted that the invention is not limited to those described above with reference to the exemplary embodiments, and can be modified in various ways without departing from the gist of the invention.

For example, instead of moving the measurement head 10, the table 40 may be configured to move in the up-and-down direction.

The present disclosure relates to the subject matter contained in Japanese Patent Application No. 2001-374382, filed on Dec. 7, 2001, which is expressly incorporated herein by reference in its entirety.

What is claimed is:

1. A three-dimensional shape and color detecting apparatus that detects a three-dimensional shape of an object and a color thereof, comprising:
   (A) a three-dimensional shape measuring system that includes:
      a slit light beam emittin system that emits a slit beam to the object; and
      a three-dimensional shave detecting system that detects the three-dimensional shape of the object in accordance with an image of an object at a portion illuminated by the slit beam; and
   (B) a color measuring system that includes:
      an illuminating system that emits light to illuminate the object, said illuminating system illuminating the object such that a predetermined area of the object is illuminated simultaneously with light having a substantially even light intensity; and
      a light receiving device that receives a reflected component of the light from the object illuminated by said illuminating system to detect a color.

2. The apparatus according to claim 1, wherein said light receiving device includes a two-dimensional image capturing element.

3. The apparatus according to claim 1, wherein said illuminating system includes a pair of surfaces from which the light is emitted to the object, said surfaces facing the object with the light receiving device located therebetween.

4. The apparatus according to claim 1, wherein a solid angle formed by the predetermined area with respect to a center of the object is one steradian or larger.

5. The apparatus according to claim 1, wherein the light illuminating the object includes diffused light.

6. The apparatus according to claim 5, wherein the diffused light is white light.

7. The apparatus according to claim 5, wherein the illuminating system includes:

a light source; and a light diffusing member that diffuses the light emitted by said light source.

8. The apparatus according to claim 7, wherein said light source is arranged, when viewed from the object side, behind said light diffusing member.

9. The apparatus according to claim 7, where said light source is arranged, when viewed from the object side, on a near side of said light diffusing member.

10. The apparatus according to claim 1, further including a rotary table on which the object is held.

11. The apparatus according to claim 1, further including a light shielding member that prevents ambient light from being incident on the object.

12. The apparatus according to claim 1, wherein light emission of said illuminating system is inhibited when the three-dimensional shape of the object is measured, and wherein emission of the slit beam of said slit light beam emitting system is inhibited when the color of the object is measured.

13. The apparatus according to claim 1, further includes a scanning system that moves said slit beam emitting system and said light receiving device relative to the object in a direction perpendicular to an extending direction of the slit beam so as to scan the object with the slit beam.

14. The apparatus of claim 1 wherein said illuminating system is a surface light source.

15. A three-dimensional shape and color detecting apparatus that detects a three-dimensional shape of an object and a color thereof, comprising:

a slit beam emitting system that emits a slit beam to the object, cross section of the slit beam being extending in a predetermined direction;

an illuminating system that emits illuminating light having substantially an even intensity distribution toward entire area of the object, thereby illuminating an area of the object simultaneously; and a light receiving device that receives an illuminated portion of the object, wherein, when the three-dimensional shape of the object is detected, the slit beam is emitted to the object and the reflected beam is received by said light receiving device, wherein, when the color of the object is detected, the illuminating light is emitted to the object and the reflected beam is received by said light receiving device; and wherein when color is measured, a predetermined area of the object is illuminated simultaneously with light having a substantially even light intensity.

16. The apparatus according to claim 15, wherein said illuminating system includes a surface light source.

17. The apparatus according to claim 15, wherein a solid angle formed by an area of said surface light source with respect to a center of the object is at least one steradian.

18. The apparatus according to claim 15, further includes a scanning system that moves said slit beam emitting system and said light receiving device relative to the object in a direction perpendicular to an extending direction of the slit beam so as to scan the object with the slit beam.

19. The apparatus according to claim 15, further comprising a controller that controls said illuminating system and said slit beam emitting system to operate, said controller inhibiting light emission of said illuminating system when the three-dimensional shape of the object is measured, and said controller inhibiting emission of the slit beam of said slit light beam emitting system when the color of the object is measured.

* * * * *